United States Patent [19]
Meyer

[11] Patent Number: 6,049,315
[45] Date of Patent: Apr. 11, 2000

[54] REPEATER ISOLATION THROUGH ANTENNA POLARIZATION DIVERSITY

[75] Inventor: Charles John Meyer, Wayne, N.J.

[73] Assignee: Lucent Technologies, Inc., Murray Hill, N.J.

[21] Appl. No.: 08/886,199

[22] Filed: Jul. 1, 1997

[51] Int. Cl.[7] ................................................. H01Q 1/36
[52] U.S. Cl. ........................ 343/895; 455/33.1; 379/59
[58] Field of Search ................................. 343/895, 715, 343/797, 893, 754, 701, 840; 455/562, 15, 33.1; 379/59

[56] References Cited

U.S. PATENT DOCUMENTS

| | | | |
|---|---|---|---|
| 2,047,531 | 7/1936 | Ardenne | 343/840 |
| 3,246,331 | 4/1966 | Royal | 343/895 |
| 4,509,055 | 4/1985 | Fassett | 343/754 |
| 4,747,160 | 5/1988 | Bossard | 455/33 |
| 5,181,043 | 1/1993 | Cooper | 343/715 |
| 5,581,268 | 12/1996 | Hirshfield | 343/701 |

*Primary Examiner*—Hoanganh Le

[57] ABSTRACT

A repeater for extending the range of communications between a base station and a mobile unit without rendering the mobile unit incapable of communicating directly with the base station. In general, the polarization of the repeater input-antenna is different from the polarization of the repeater output-antenna such that sufficient isolation exists between the input and output antennas without substantially reducing the ability of the input antenna and the output antenna to receive signals from and output signals to the base station and the mobile units. In a preferred embodiment, the repeater input antenna is circularly polarized in one direction while the repeater output antenna is circularly polarized in a direction opposite from the input antenna.

4 Claims, 2 Drawing Sheets

REPEATER ISOLATION THROUGH ANTENNA POLARIZATION DIVERSITY

FIELD OF THE INVENTION

The present invention relates to wireless communications, and more particularly to a wireless signal repeater having improved isolation.

BACKGROUND OF THE INVENTION

Some wireless communication systems utilize a series of base stations to provide radiocommunications to mobile subscriber units located in a given territory or geographic region. One constraint imposed on such wireless communication systems is a limitation on the amount of power that the base stations and the mobile units can output when communicating with each other. This limitation results in each base station and each mobile unit having a limited range of communication.

To extend the range of communication or coverage between a mobile unit and a base station, some wireless communications systems use repeaters. In general, the repeaters are composed of an input antenna for receiving a signal, an amplifier circuit for amplifying the received signal, and an output antenna for outputting the amplified signal. Thus, the range of communication or coverage of a base station can be increased by placing a repeater in a location such that a signal sent from the base station is received by the input antenna, amplified by the amplifier circuit, and output through the output antenna. In this capacity, the repeater increases the strength of the base station signal so that the base station signal can be received by a mobile unit at greater distances from the base station.

Since it is common for repeaters having the above structure to transmit the amplified signal from the output antenna at the same frequency as the signal received at the repeater input antenna, such repeaters are usefull in wireless communication systems only when there is sufficient isolation between the input antenna and the output antenna of the repeater. A repeater is said to have sufficient isolation when the signal transmitted from its output antenna (i.e. amplified signal) does not interfere with or prevent the accurate reception of the input signal received through its input antenna. For example, sufficient isolation is not found where the signal transmitted from the output antenna is received by the input antenna, thus causing the amplifier circuit to oscillate.

One method for providing sufficient isolation between the input antenna and the output antenna of a repeater is to output the amplified signal through the repeater output antenna at a different frequency than the signal received through the repeater input antenna. This method, however, suffers from the major drawback that it prevents a mobile unit from being able to directly communicate with both the base station and the repeater. This is due to the fact that the mobile unit, which has the ability to be tuned to only one frequency, can not be tuned to both the frequency transmitted by the base station and the frequency transmitted by the repeater at the same time. As a result, if the mobile unit is tuned to the frequency of the signal transmitted from the output antenna of the repeater, the mobile unit will not be able to communicate directly with the base station, and vice verse. Thus, such a method for providing sufficient repeater isolation is not desirable for wireless systems wherein it is desirable for the mobile units to communicate with both base stations and repeaters.

Another method for providing sufficient isolation between the input antenna and the output antenna of a repeater is disclosed by Marque-Pucheu in U.S. Pat. No. 5,509,028, issued Apr. 16, 1996, and incorporated herein by reference. Marque-Pucheu discloses a repeater that uses a technique called spectrum reversal to provide isolation between its input and output antennas. A repeater employing spectrum reversal basically reverses the spectrum of a signal received through the repeater input antenna, and outputs the reversed-spectrum signal through the output antenna. This method, however, suffers from the same drawback as the method involving the use of different frequencies, as described above. That is, a mobile unit can not be tuned to receive both the reverse-spectrum signal from the repeater and the non-reverse-spectrum signal from a base station. Thus, such a method for providing sufficient repeater isolation is not desirable for wireless systems wherein it is desirable for the mobile units to communicate with both base stations and repeaters.

Another method for providing sufficient isolation between the input antenna and the output antenna of a repeater is disclosed by Justice et al. in U.S. Pat. No. 5,600,333, issued Feb. 4, 1997, and incorporated herein by reference. Justice et al. disclose the use of electromagnetic shielding between the input antenna and the output antenna. The electromagnetic shielding essentially prevents the signal transmitted from the repeater output antenna from being received by the repeater input antenna. As a result, the shielding can prevent repeater oscillation, and thus provide sufficient repeater isolationBy By placing an electromagnetic shield between the input antenna and the output antenna of the repeater, however, the communication range of the repeater may be significantly reduced. That is, the electromagnetic shield may block the amplified signal output from the repeater output antenna such that the amplified signal propagates in only one direction that is perpendicular to the electromagnetic shield. As a result, a mobile unit located in different direction from the output antenna may not receive the amplified signal from the repeater, thus limiting the ability of the repeater to extend the range of communications of the base station.

SUMMARY OF THE INVENTION

The present invention provides a repeater for extending the range of communications between a base station and a mobile unit without rendering the mobile unit incapable of communicating directly with the base station. In general, the polarization of the repeater input-antenna is different from the polarization of the repeater output-antenna such that sufficient isolation exists between the input and output antennas without substantially reducing the ability of the input antenna and the output antenna to receive and output signals to and from the base station and the mobile units.

In a preferred embodiment, the input antenna is circularly polarized in one direction while the output antenna is circularly polarized in a direction opposite from the input antenna. In such an embodiment, signals transmitted from a base station can be received by the repeater as long as the base station antenna is not circularly polarized in a direction opposite the input antenna of the repeater. Similarly, signals transmitted from the repeater can be received by a mobile unit as long as the mobile unit antenna is not circularly polarized in a direction opposite the output antenna of the repeater. Thus, since the base stations and mobile units in most wireless systems have antennas that are vertically polarized, horizontally polarized or somewhere in-between vertical and horizontal polarization, a repeater having such circularly polarized antennas provides sufficient isolation without losing the ability to communicate with the base stations and the mobile units.

DETAILED DESCRIPTION OF ILLUSTRATIVE EMBODIMENTS OF THE INVENTION

Figure 1:
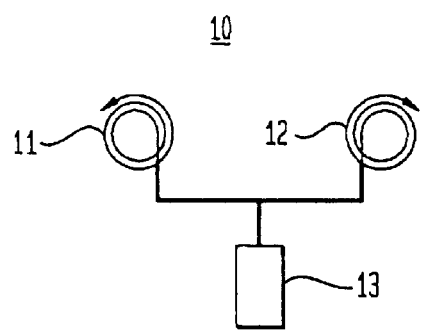
FIG. 1 is a pictorial view of an illustrative embodiment of a repeater according to the present invention.

Referring now to FIG. 1 there is shown a pictorial view of one illustrative embodiment of a repeater according to the present invention, hereinafter referred to as repeater 10. As shown, repeater 10 has a left-hand-circularly-polarized input antenna, or input antenna 11, a right-hand-circularly-polarized output antenna, or output antenna 12, and an amplifier circuit 13. In operation, amplifier circuit 13 amplifies signals received through input antenna 11 to form an amplified signal. The amplified signal is then transmitted through output antenna 12 such that the range of propagation, of a signal received through input antenna 11, is extended.

The different polarizations between input antenna 11, i.e. left-hand circular polarization, and output antenna 12, i.e. right-hand circular polarization, provide repeater 11 with sufficient antenna isolation. Sufficient antenna isolation is found when a signal output from output antenna 12 does not interfere with the reception and/or amplification of a signal received by input antenna 11. As a result, sufficient isolation is not found when an amplified signal output from output antenna 12 is received by input antenna 11 and re-amplified by amplifier circuit 13, thus causing oscillation.

Figure 1A:
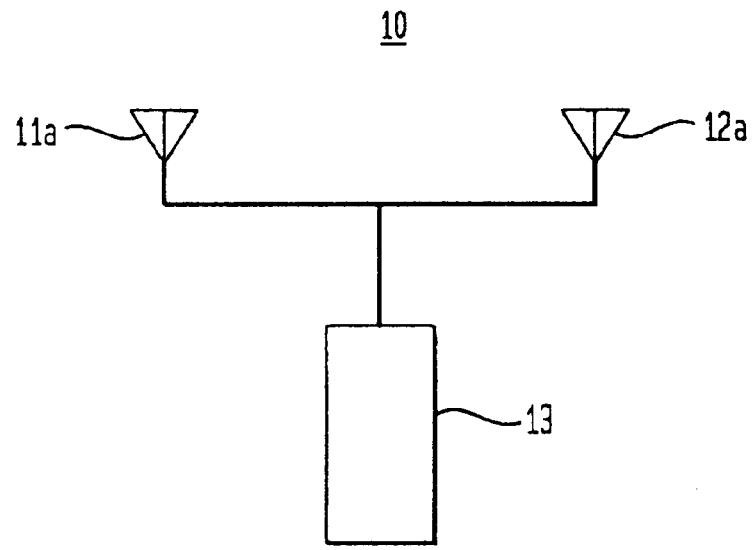
FIGS. 1A and 1B are pictorial views of alternative embodiments of the repeater of the present invention.
Figure 1B:
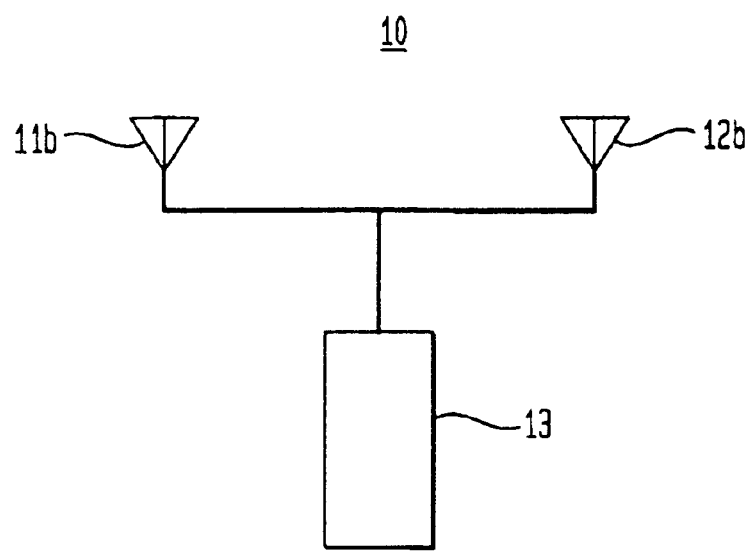

It should therefore be noted that a repeater according to the present invention is limited by the requirement that the input antenna and the output antenna have different polarizations that provide the repeater with sufficient isolation, as just described. Thus, one skilled in the art can use any desired combination of different input and output antenna polarizations that provide such sufficient isolation. For example, one illustrative embodiment of a repeater according to the present invention may have an input antenna that is substantially vertically polarized and an output antenna that is circularly polarized. In another embodiment, the input antenna is circularly polarized and the output antenna is substantially vertically polarized. In yet another embodiment as shown in FIG. 1A, the input antenna 11a is vertically polarized and the output antenna 12a is horizontally polarized. In still another embodiment, as shown in FIG. 1B, the input antenna 11a is horizontally polarized and the output antenna 12a is vertically polarized.

It should be noted, however, that the combination of different antenna polarizations must not substantially reduce the ability of the repeater to increase the range of communications between two devices. For example, when using such a repeater in a wireless communication system to extend the range of communication between a base station and a mobile unit, the chosen polarization of the input and output antennas of the repeater must not substantially reduce the ability of a mobile unit to communicate with a base station and/or the repeater, and vice versa. Thus, the actual input and output antenna polarizations used in a repeater according to the present invention are limited to those polarizations that do not substantially reduce the ability of the repeater to receive signals from and send signals to devices communicating in the wireless system For this reason, it is preferable for a repeater according to the present invention to have an input antenna that is circularly polarized in one direction and an output antenna that is circularly polarized in the opposite direction. Although the oppositely circularly polarized antennas provide sufficient repeater isolation between each other, they do not provide isolation between the repeater and other wireless devices that use vertically or horizontally polarized antennas such as base stations and mobile units. Thus, a repeater having such oppositely polarized antennas provides sufficient repeater isolation without substantially reducing the ability of the repeater to receive signals from and send signals to devices communicating in a wireless system.

Figure 2:
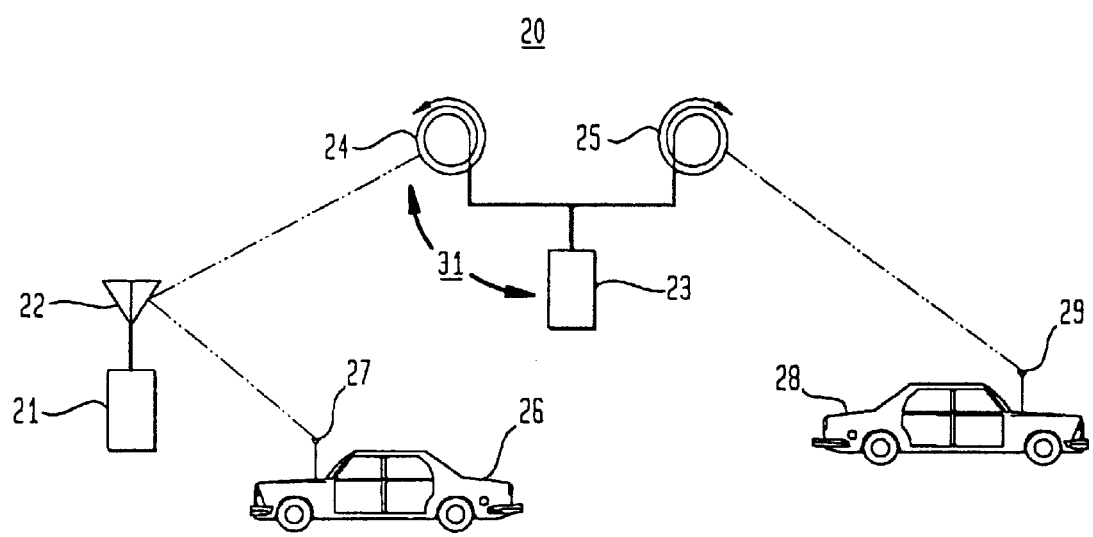
FIG. 2 is pictorial view of a wireless communication system employing a repeater according to the present invention.

Referring now to FIG. 2, there is shown one illustrative embodiment of a wireless communications system having a repeater according to the present invention, hereinafter referred to as wireless system 20. As shown, wireless system 20 has a base station 21, a repeater 31 and mobile units 26 and 28. Mobile units 26 and 28 have vertically polarized antennas 27 and 29, respectively, and base station 21 has vertically polarized antenna 22. Repeater 31 has left-hand-circularly-polarized input antenna, or input antenna 24, right-hand-circularly polarized output antenna, or output antenna 25, and amplifier circuit 23.

In operation, mobile units 26 and 28 are operable to communicate with both base station 21 and repeater 31, depending on their distance therefrom. For example, if base station 21 is within the communication range of mobile unit 26, and mobile unit 26 is within the communication range of base station 21, then mobile unit 26 can communicate with base station 21 through their respective vertically polarized antennas 27 and 22. If, however, a mobile unit moves outside the aforementioned communication ranges, then the mobile unit may only be able to communicate with base station 21, and vice versa, through repeater 31.

To illustrate, base station 21 can send a signal through vertically polarized antenna 22 to input antenna 24 of repeater 31 which amplifies the signal in amplifier circuit 23, and outputs the amplified signal to mobile unit 28 which receives the amplified signal through vertically polarized antenna 29. Similarly, mobile unit 28 can send a signal to antenna 24 of repeater 31, which amplifies the signal in amplifier circuit 23 and outputs the amplified signal to base station 21 through output antenna 25. As described above, the different polarizations between input antenna 24, i.e. left-hand circular polarization, and output antenna 25, i.e. right-hand circular polarization, provide repeater 31 with sufficient antenna isolation without substantially reducing the ability of repeater 31 to extend the range of communications between base station 21 and mobile unit 28.

It should be noted, however, that a repeater according to the present invention is not limited to providing one-way communications through one set of antennas, as shown and described for repeater 31 above. That is, a repeater according to the present invention is not limited to providing one-way communications from a base station to a mobile unit through only two antennas. Rather, a repeater according to the present invention can provide two-way communications through any number of antennas. For example, in one illustrative embodiment, a repeater according to the present invention may be configured to provide full-duplex capabilities through a pair of input/output antennas. In such an embodiment, one full-duplex antenna is operable to receive signals from and transmit signals to one device, or one type of device (e.g. a base station), and the other full-duplex antenna is operable to receive signals from and transmit signals to another device, or another type of device (e.g. a mobile unit). In such an embodiment, the above stated requirement that a repeater according to the present invention have different polarizations for its input antenna and its output antenna is satisfied when the full-duplex antenna that receives a signal (i.e. the input antenna) has a different polarization than the full duplex antenna that transmits an amplified or repeated version of that received signal (i.e. the output antenna).

In another illustrative embodiment, a repeater according to the present invention may be configured to provide simplex communications through four different antennas which are operable to provide communications in one direction only. In such an embodiment, the repeater has a first antenna operable to receive signals from a first device (e.g. a base station), a second antenna operable to transmit signals to the first device (e.g. the base station), a third antenna operable to receive signals from a second device (e.g. a mobile unit), and a fourth antenna operable to send signals to the second device (e.g. the mobile unit). In such an embodiment, the above stated requirement that the repeater input antenna has a different polarization than the repeater output antenna is satisfied when the repeater antenna that receives a signal from one device has a different polarization than the repeater antenna that transmits an amplified version of the received signal to the other device.

Thus, it should be understood that the requirement that a repeater according to the present invention has an input antenna polarization that is different from an output antenna polarization, actually means that the polarization of the repeater antenna which receives a signal from one device (i.e. the input antenna) must be different from the polarization of the repeater antenna which sends an amplified version of the received signal to another device (i.e. the output antenna), no matter which or how many antennas are used. That is, regardless of the antenna scheme (e.g. full duplex or simplex), a repeater according to the present invention is only limited by the requirement that the polarization of the repeater antenna which receives a given signal has a different polarization than the repeater antenna that outputs an amplified version of that received signal.

When operating in a wireless system such as wireless system 20, however, this is not the only limitation on the polarizations of the repeater input and output antennas. As described above, an additional limitation or requirement is that the polarization of the repeater input and the output antennas must not be such that they substantially limit or eliminate the ability of the repeater to communication with wireless system devices. For example, in wireless system 20, the polarization of input antenna 24 and output antenna 25 should not substantially limit the ability of repeater 31 to extend communications between base station 21 and mobile unit 28. A substantial limitation on the ability of repeater 31 to extend communications between base station 21 and mobile unit 28 is found when the polarization of input antenna 21 and/or output antenna 25 is substantially incompatible with the polarization of the base station antenna 22 and/or mobile unit antenna 29. Substantial incompatibility is found when repeater 31 can not receive signals sent from base station 21 and/or mobile unit 28, and vice versa.

For example, substantial incompatibility can be found when a base station antenna is vertically polarized and the repeater input antenna is horizontally polarized, or when the base station antenna is left-hand circularly polarized and the repeater input antenna is right-hand circularly polarized. Thus, in summary, a repeater according to the present invention must have an input antenna with a different polarization than its output antenna, as defined above, such that the repeater has sufficient antenna isolation without substantially limiting the ability of the repeater to extend communications between a pair of devices communicating on a wireless system.

While the invention has been particularly shown and described with reference to specific embodiments, it will be recognized by those skilled in the art that modifications and changes may be made to the present invention without departing from the spirit and scope thereof As a result, the invention in its broader aspects is not limited to specific details shown and described herein. Various modifications may be made without departing from the spirit or scope of the general inventive concept as defined by the appended claims and their equivalents.

We claim:

1. Repeater comprising:
   an input antenna having a first polarization;
   an amplifier; and
   an output antenna having a second polarization that is different from said first polarization, wherein one of said input and output antennas is a right-hand circularly-polarized antenna and the other is a left-hand circularly-polarized antenna, and
   whereby a signal received by said input antenna is amplified by the amplifier and is sufficiently isolated from a signal output from said output antenna.

2. The repeater of claim 1, wherein said repeater is operable to receive a signal through said input antenna, amplify said received signal to form an amplified signal, and output said amplified signal through said output antenna.

3. The repeater of claim 2 wherein a base station is operable to transmit said signal received through said input antenna, and wherein a mobile unit is operable to receive said amplified signal output through said output antenna.

4. A wireless communication system comprising at least one base station, said at least one base station being operable to provide a communication channel to a mobile unit communicating on the wireless communication system, and at least one repeater comprising an input antenna, an amplifier for amplifying a signal received by the input antenna, and an output antenna, said input antenna having a different polarization than said output antenna, wherein one of said input and output antennas is right-hand circularly polarized and the other is left-hand circularly polarized.

* * * * *